United States Patent
Thomas et al.

(10) Patent No.: US 11,558,457 B2
(45) Date of Patent: *Jan. 17, 2023

(54) DYNAMIC THROUGHPUT INGESTION OF BACKUP SOURCES

(71) Applicant: Cohesity, Inc., San Jose, CA (US)

(72) Inventors: Markose Thomas, San Jose, CA (US); Chinmaya Manjunath, San Jose, CA (US)

(73) Assignee: Cohesity, Inc., San Jose, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 17/156,015

(22) Filed: Jan. 22, 2021

(65) Prior Publication Data

US 2021/0203722 A1 Jul. 1, 2021

Related U.S. Application Data

(63) Continuation of application No. 16/373,138, filed on Apr. 2, 2019, now Pat. No. 10,944,822, which is a continuation of application No. 14/863,178, filed on Sep. 23, 2015, now Pat. No. 10,298,680.

(51) Int. Cl.

| | | |
|---|---|---|
| *H04L 67/1095* | (2022.01) | |
| *H04L 67/51* | (2022.01) | |
| *H04L 43/04* | (2022.01) | |
| *H04L 43/0888* | (2022.01) | |
| *H04L 43/0817* | (2022.01) | |
| *H04L 43/16* | (2022.01) | |

(52) U.S. Cl.
CPC .......... *H04L 67/1095* (2013.01); *H04L 43/04* (2013.01); *H04L 43/0817* (2013.01); *H04L 43/0888* (2013.01); *H04L 67/51* (2022.05); *H04L 43/16* (2013.01)

(58) Field of Classification Search
CPC ................ H04L 67/1095; H04L 43/04; H04L 43/0817; H04L 43/0888; H04L 67/51; H04L 43/16; H04L 67/1097
See application file for complete search history.

(56) References Cited

U.S. PATENT DOCUMENTS

| | | | |
|---|---|---|---|
| 5,495,607 | A | 2/1996 | Pisello |
| 5,499,357 | A | 3/1996 | Sonty |
| 5,832,225 | A | 11/1998 | Hacherl |
| 6,539,425 | B1 | 3/2003 | Stevens |
| 6,665,812 | B1 | 12/2003 | Blumenau |

(Continued)

OTHER PUBLICATIONS

Dubois et al., "Backup and Recovery: Accelerating Efficiency and Driving Down IT Costs Using Data Deduplication", 2010.

(Continued)

*Primary Examiner* — Sm A Rahman
(74) *Attorney, Agent, or Firm* — Van Pelt, Yi & James LLP

(57) ABSTRACT

A method and apparatus for dynamically adjusting an ingestion rate for backup operations on a source system. The method generally includes monitoring a resource utilization related to one or more performance metrics of the source system in performing at least a primary workload. Based on the monitored resource utilization, the backup system determines a data ingestion rate for backup operations on the source system. The backup system ingests data from the source system to a backup repository at the determined data ingestion rate.

20 Claims, 6 Drawing Sheets

(56) References Cited

U.S. PATENT DOCUMENTS

| | | |
|---|---|---|
| 6,725,253 B1 | 4/2004 | Okano |
| 6,748,447 B1 | 6/2004 | Basani |
| 6,847,984 B1 | 1/2005 | Midgley |
| 6,983,317 B1 | 1/2006 | Bishop |
| 7,546,484 B2 | 6/2009 | Sen |
| 7,636,801 B1 | 12/2009 | Kekre |
| 8,281,035 B2 | 10/2012 | Farber |
| 8,849,955 B2 | 9/2014 | Prahlad |
| 8,990,874 B2 | 3/2015 | Huang |
| 8,996,461 B1 * | 3/2015 | Natanzon ............ G06F 3/0619 707/634 |
| 9,106,887 B1 | 8/2015 | Owen |
| 9,509,612 B1 | 11/2016 | Armorer |
| 9,588,891 B2 | 3/2017 | Atkisson |
| 9,923,798 B1 | 3/2018 | Bahadur |
| 9,940,203 B1 | 4/2018 | Ghatnekar |
| 2002/0075844 A1 | 6/2002 | Hagen |
| 2002/0078174 A1 | 6/2002 | Sim |
| 2002/0133491 A1 | 9/2002 | Sim |
| 2002/0161860 A1 | 10/2002 | Godlin |
| 2003/0140121 A1 | 7/2003 | Adams |
| 2004/0122832 A1 | 6/2004 | Heil |
| 2004/0186861 A1 | 9/2004 | Phatak |
| 2004/0267838 A1 | 12/2004 | Curran |
| 2005/0015641 A1 | 1/2005 | Alur |
| 2005/0210080 A1 | 9/2005 | Saika |
| 2006/0085549 A1 | 4/2006 | Hasti |
| 2006/0129615 A1 | 6/2006 | Derk |
| 2006/0161753 A1 * | 7/2006 | Aschoff ................ G06F 3/067 711/170 |
| 2007/0073934 A1 | 3/2007 | Rogers |
| 2008/0049786 A1 | 2/2008 | Ram |
| 2008/0077358 A1 | 3/2008 | Marvasti |
| 2008/0117869 A1 | 5/2008 | Freen |
| 2008/0144661 A1 | 6/2008 | Ali |
| 2008/0225718 A1 * | 9/2008 | Raja .................. H04L 67/1008 370/252 |
| 2009/0164530 A1 | 6/2009 | Gilpin |
| 2009/0172322 A1 | 7/2009 | Gilpin |
| 2009/0217030 A1 | 8/2009 | Premkumar |
| 2009/0225762 A1 | 9/2009 | Davidson |
| 2009/0276771 A1 | 11/2009 | Nickolov |
| 2010/0002723 A1 | 1/2010 | Kerr |
| 2010/0146517 A1 | 6/2010 | Aschen |
| 2010/0306267 A1 | 12/2010 | Zamkoff |
| 2011/0137854 A1 | 6/2011 | Walter |
| 2011/0197198 A1 | 8/2011 | Kanso |
| 2011/0238546 A1 | 9/2011 | Certain |
| 2011/0258391 A1 | 10/2011 | Atkisson |
| 2012/0026877 A1 | 2/2012 | Rajappan |
| 2012/0084386 A1 | 4/2012 | Fu |
| 2012/0330892 A1 | 12/2012 | Benjamin |
| 2013/0024581 A1 | 1/2013 | Myhill |
| 2014/0187239 A1 | 7/2014 | Friend |
| 2014/0281732 A1 | 9/2014 | Elias |
| 2014/0304352 A1 | 10/2014 | Chaudhary |
| 2015/0019727 A1 | 1/2015 | Parakh |
| 2015/0134795 A1 | 5/2015 | Theimer |
| 2015/0172102 A1 * | 6/2015 | DeCusatis .......... H04L 43/0876 370/218 |
| 2015/0199414 A1 | 7/2015 | Braginsky |
| 2015/0249708 A1 | 9/2015 | Feinberg |
| 2015/0278331 A1 | 10/2015 | Blea |
| 2015/0326481 A1 | 11/2015 | Rector |
| 2016/0014229 A1 | 1/2016 | Seedorf |
| 2016/0044100 A1 | 2/2016 | Tripathy |
| 2016/0048408 A1 | 2/2016 | Madhu |
| 2016/0323145 A1 | 11/2016 | Anderson |
| 2016/0342618 A1 | 11/2016 | Watkins |

OTHER PUBLICATIONS

Liu et al., "Contextual Trust Aided Enhancement of Data Availability in Peer-to-Peer Backup Storage Systems", 2011.

Perin, "Configuration & Software Distribution in Maintenance Environments on Heterogeneous Platforms", 1991 (Year: 1991).

* cited by examiner

DYNAMIC THROUGHPUT INGESTION OF BACKUP SOURCES

CROSS REFERENCE TO OTHER APPLICATIONS

This application is a continuation of U.S. patent application Ser. No. 16/373,138, entitled DYNAMIC THROUGHPUT INGESTION OF BACKUP SOURCES filed Apr. 2, 2019, which is incorporated herein by reference for all purposes, which is a continuation of U.S. patent application Ser. No. 14/863,178, entitled DYNAMIC THROUGHPUT INGESTION OF BACKUP SOURCES filed Sep. 23, 2015, now U.S. Pat. No. 10,298,680, which is incorporated herein by reference for all purposes.

BACKGROUND

Field

Embodiments of the present disclosure generally relate to a backup system, and more specifically to dynamically adjusting a rate of ingesting backup data based on resource utilization at a source system being backed up by the backup system.

Description of the Related Art

Backing up a computer system generally includes copying the contents of the computer system to an external storage system. A basic backup operation may generate a bit-by-bit duplicate of a source system. In some cases, backup operations may compress a backup and/or compare previously backed up data to the data to be backed up, which generally uses additional resources (e.g., processing time). Thus, backing up computer systems is generally a resource-intensive operation.

Backup systems are generally configured to perform backups based on a set schedule and using a pre-set ingestion rate. These schedules may be configured by a system administrator to begin backup operations when it is assumed that the system is operating at a low load. For example, for an online shopping system, backup operations could be scheduled for a weekday morning period during which the source system typically is lightly loaded.

If backup operations are scheduled during higher load periods, performance of backup operations may degrade the performance of the source system. For example, the source system may reduce the resources available to run the source system's primary function(s) (e.g., serving a website, hosting a transactional database, etc.) to allow the backup system to perform a backup at the pre-set ingestion rate. Correspondingly, if backup operations are scheduled during lower load periods, the pre-set ingestion rate may not fully utilize the resources of the source system. Backup operations at the pre-set ingestion rate may take more time to complete than backup operations performed using the resources that are not allocated to the source system's primary function(s).

In some cases, resource usage at a source system may not be predictable. Source load may spike from an assumed baseline performance (e.g., for an online shopping system, Black Friday and Cyber Monday may impose higher resource utilization). Given a pre-set ingestion rate, a source system may not have enough resources available to perform its primary function when resource utilization spikes.

SUMMARY

The present disclosure generally provides a method for dynamically adjusting an ingestion rate for backup operations based on resource utilization at a source system. The method generally includes monitoring a resource utilization related to one or more performance metrics of the source system in performing at least a primary workload. Based on the monitored resource utilization, the backup system determines a data ingestion rate for backup operations on the source system. The backup system ingests data from the source system to a backup repository at the determined data ingestion rate.

Another embodiment includes a computer-readable storage medium having instructions, which, when executed on a processor, performs an operation for dynamically adjusting an ingestion rate for backup operations on a source system. The operation generally includes monitoring a resource utilization related to one or more performance metrics of the source system in performing at least a primary workload. Based on the monitored resource utilization, the backup system determines a data ingestion rate for backup operations on the source system. The backup system ingests data from the source system to a backup repository at the determined data ingestion rate.

Still another embodiment includes a processor and a memory storing a program, which, when executed on the processor, performs an operation for dynamically adjusting an ingestion rate for backup operations on a source system. The operation generally includes monitoring a resource utilization related to one or more performance metrics of the source system in performing at least a primary workload. Based on the monitored resource utilization, the backup system determines a data ingestion rate for backup operations on the source system. The backup system ingests data from the source system to a backup repository at the determined data ingestion rate.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments presented herein describe techniques for dynamically managing an ingestion rate for capturing data from a source system based on resource utilization at the source system. Doing so allows a backup system to perform backup operations on a source system based on resources available at the source system without disrupting other computing demands placed on the source system (e.g., the source system's primary workload). Decreasing the ingestion rate allows a backup system to decrease backup resource utilization at a source system and thus allow the source system to allocate additional resources to the source system's primary workload. Conversely, increasing the ingestion rate when the source system is being backed up allows the backup system to use additional or excess capacity to complete backup operations faster.

In one embodiment, backup systems monitor resource utilization at each source system (e.g., web servers, database servers, development servers, etc.) to be backed up. Resource utilization metrics include CPU usage, memory usage, network throughput, and other relevant metrics. As backup operations are performed, the resource utilization monitors in a backup system can determine whether to increase an ingestion rate (in response to determining that the source system has resources that are currently idle but could be used to accelerate backup operations) or decrease the ingestion rate (in response to determining that activity at the source system has spiked).

Advantageously, dynamically managing backup ingestion rates based on resource utilization allows a backup system to back up a source system without negatively impacting performance of the system subject to the backup. When resource utilization at a source system spikes, the backup system can decrease the backup ingestion rate to allow the source system to provide requested the services and/or data with minimal performance delays. As resource utilization at the source system decreases, the backup system can increase the backup ingestion rate to fully utilize the resources available at the source system and decrease the amount of time needed to back up the source system.

Figure 1:
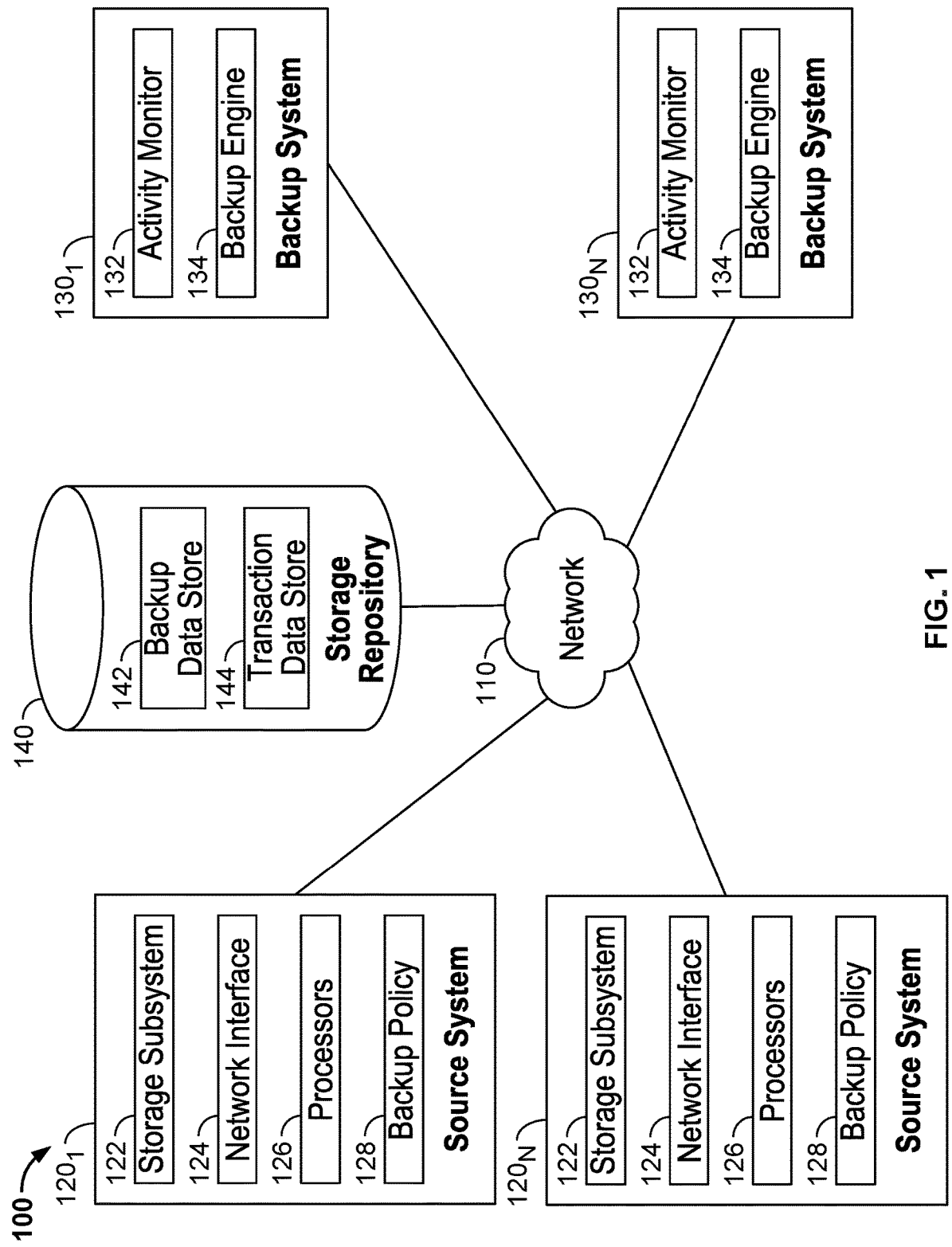
FIG. 1 illustrates an example of a networked computing environment, according to one embodiment.

FIG. 1 illustrates an example computing environment 100, according to an embodiment. As illustrated, computing environment 100 includes a plurality of source systems 120, a plurality of backup systems 130, and storage repository 140, connected to a network 110.

Each of the plurality of source systems 120 generally includes a storage subsystem 122, one or more network interfaces 124, and one or more processors 126. A source system 120 may provide various services. For example, an internet server may be installed on a source system 120 to provide web services to other machines. Some source systems 120 may host databases (e.g., relational databases or NoSQL-type data repositories) that may be accessed by one or more web services. In a development environment, one or more source systems 120 may be production machines on which a current version of software is deployed. Other source systems 120 may host code repositories and act as test systems on which software updates are deployed in a test environment before the updates are deployed on the production machines.

In some cases, source system 120 may host one or more virtual machines that may share resources (i.e., storage subsystem 122, network interfaces 124, processors 126, and/or other devices connected to source system 120). The virtual machines may be deployed similarly to physical machines in a larger system (e.g., a website host, development environment, etc.) as described above. In some cases, virtual machines may be deployed on a per-user basis in a computer network Each source system 120 is associated with a backup policy 128. Backup policy 128 generally specifies how source system 120 prioritizes the primary workload and backup operations. Source systems 120 that are required to provide services in real-time or with minimal delays may prioritize the source system's primary workload over backup operations. Conversely, source systems 120 that are more delay tolerant may prioritize backup operations over the source system's primary workload.

In some cases, backup policy 128 may further include a high activity threshold and a low activity threshold. The high activity threshold indicates a primary workload resource utilization at which the data ingestion rate for backup operations should be reduced. Correspondingly, the low activity threshold indicates a primary work resource utilization at which the data ingestion rate for backup operations should be increased One or more backup systems 130 may be deployed in computing environment 100. Each backup system 130 generally includes an activity monitor 132 and a backup engine 134. Activity monitor 132 and backup engine 134 are illustrated as separate modules; however, in some cases, activity monitor 132 may be implemented as a component within backup engine 134.

Activity monitor 132 generally includes one or more interfaces for obtaining resource utilization information from each of the source systems 120 in computing environment 100. Activity monitor 132 may periodically query a source system 120 to obtain resource utilization from one or more resources at source system 120. For example, activity monitor 132 may obtain information about read/write activity, throughput, and storage system latency from storage system 122, throughput information (packets and/or bits transmitted and received) at network interface 124, and processor utilization (e.g., processor idle time) from one or more source systems 120. In some cases, activity monitor 132 may log instantaneous resource utilization and a moving average of resource utilization, which may smooth out resource utilization spikes.

Backup engine 134 accesses each of the source systems 120 (e.g., via network interface 124) to back up storage system 122 at each source system 120 to storage (e.g., storage repository 140). Backup engine 134 may query activity monitor 132 periodically to obtain resource utilization data from a source system 120. The backup engine 134 uses resource utilization data queried from activity monitor 132 to determine the ingestion rate to be used in backing up source system 120 and storing the backup in storage repository 140. As resource utilization at a source system 120 increases (e.g., due to increases in an amount of content requested from a source system hosting a website, increases in processor utilization from compiling and debugging code at a source system hosting a code management system, etc.), backup engine 134 may decrease the data ingestion rate from a source system 120 and stored in storage repository 140. As resource utilization at the source system 120 decreases, backup engine may increase the data ingestion rate from source system 120.

Backup engine 134 is connected to storage repository 140. Storage repository 140 may be a distributed storage system and may contain backup data from one or more source systems 120. Storage repository 140 may include a backup data store 142 and transaction data 144.

Backup data store 142 may implement a distributed file system (e.g., a storage system compliant with the Network File System protocol) to allow backup engine 134 to write backup data to backup data store 142. In some cases, backup data store may implement a directory structure in which backup data is stored.

Backup data for a source system may be stored in backup data store 142 as an initial backup and one or more snapshots reflecting changes to the source system at a given point in time. When a snapshot is generated, backup engine 134 may store the snapshot in backup data store 142 as a series of pointers to previously stored data blocks for data that has not changed from the previous snapshot and copies of data that has changed since the previous snapshot. Thus, a snapshot generally takes up a smaller amount of space in backup data store 142 than the initial backup.

Transaction data store 144 generally provides a repository in which information about backup operations are stored. As backup engine 134 performs backup operations on source systems 120, backup engine 134 commits information about backup operations to transactional data store. In an embodiment, transaction data store 144 may implement a persistent data store which associates a backup operation with a snapshot (or initial backup) stored in backup data store 142.

Figure 2:
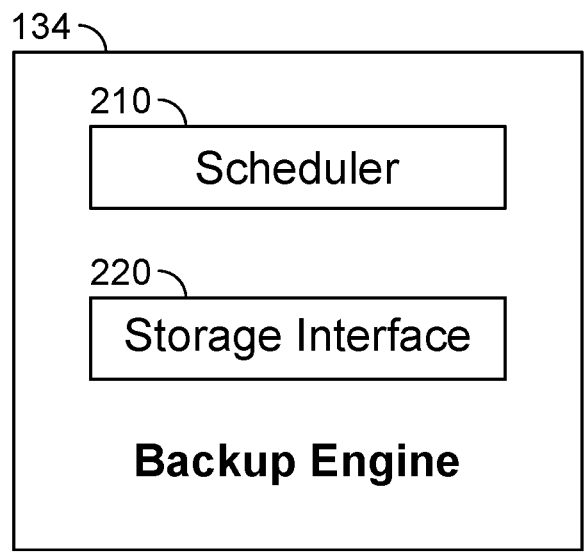
FIG. 2 illustrates a block diagram of an example backup engine, according to one embodiment.

FIG. 2 illustrates an example block diagram of a backup engine 134, according to some embodiments. As illustrated, backup engine 134 may include a scheduler 210 and a storage interface 220.

Scheduler 210 polls activity monitor 132 for resource utilization information from a source system 120. In some cases, scheduler 210 may poll activity monitor 132 on a regular basis (e.g., every n seconds). As described above, scheduler 210 may receive, for example, information about data throughput at storage subsystem 122, network throughput at network interface 124, and idle time at processor 126.

Based on the resource utilization information obtained from a source system 120 via activity monitor 132, scheduler 210 adjusts the data ingestion rate from source system 120. Scheduler 210 may adjust the data ingestion rate from source system 120 based on a backup policy 128 associated with source system 120. In some cases, scheduler 210 can adjust the data ingestion rate to fully use the resources available at source system 120 (i.e., such that the source system's primary workload and backup operations fully load storage subsystem 122, network interface 124, and/or processors 125). In some cases, scheduler 210 can increase the data ingestion rate from source system 120 if resource utilization for the primary workload at source system 120 falls below a low activity threshold or decrease the data ingestion rate if resource utilization for the primary workload at source system 120 exceeds a high activity threshold.

Storage interface 220 allows backup engine 134 to obtain data from storage subsystem 122 at a source system 120 and store backup data in backup data store 142 at storage repository 140. Storage interface 220 obtains data from storage subsystem 122 at the source system 120 using the data ingestion rate determined by scheduler 210. As backup engine 134 ingests data from a source system 120 through storage interface 220, backup engine 134 may write the data to backup data store 142 at storage repository 140.

In some cases, such as an initial backup of source system 120, backup engine 134 may write a bit-by-bit copy of the data obtained from storage subsystem 122 at source system 120 to backup data store 142. For subsequent backup operations of source system 120, backup engine 134 may ingest data from storage subsystem 122 at the determined data ingestion rate and compare the ingested data to data previously stored in backup data store 142. As described above, if backup engine 134 determines that the data ingested from source system 120 is the same as data previously stored in backup data store 142, storage interface 220 may write a pointer to the previously stored data in backup data store 142. Otherwise, storage interface 220 may write the new data to backup data store 142.

When backup engine 134 finishes backup operations on source system 120, storage interface 220 may commit the backup to storage repository 140. The data stored in backup data store 142 may be associated with an entry in transaction data store 144.

Figure 3:
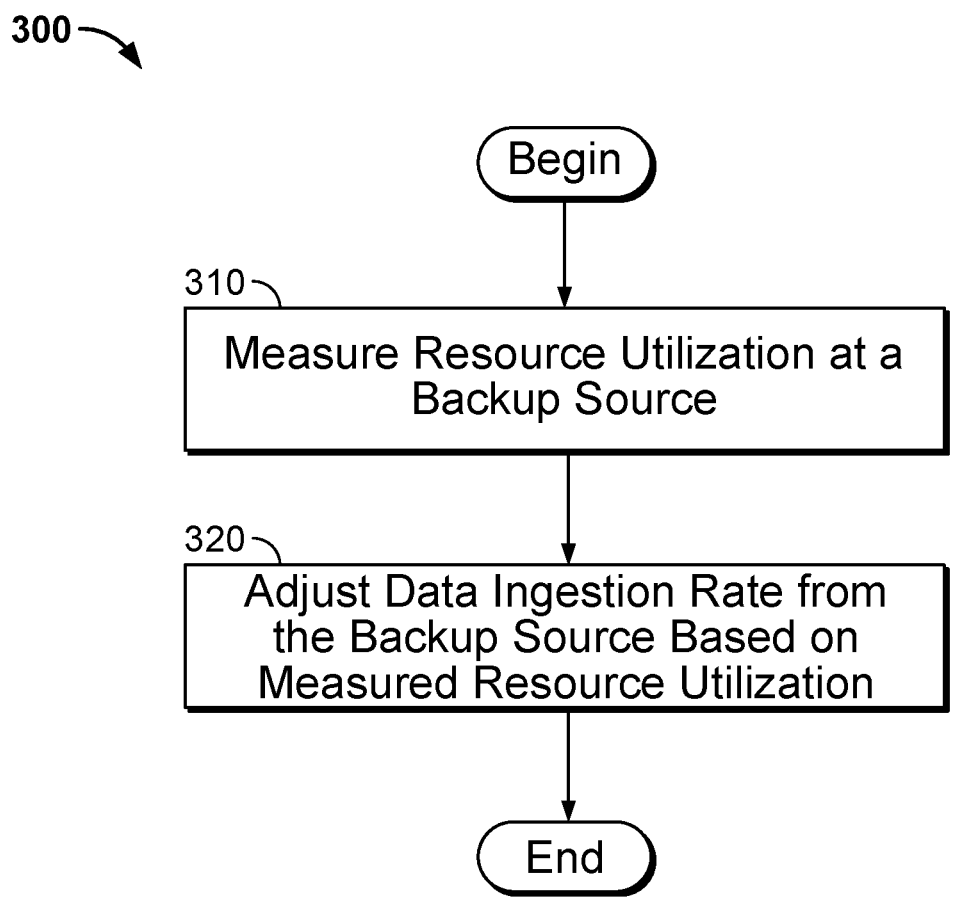
FIG. 3 illustrates an example method for dynamically adjusting a backup ingestion rate based on resource utilization at a source system, according to one embodiment.

FIG. 3 illustrates an example method 300 for dynamically adjusting a data ingestion rate for backup operations, according to some embodiments. Method 300 begins at step 310, where the backup engine measures resource utilization at a backup source. As described above, resource utilization may include processor idle time, network throughput or activity, an amount of read/write operations at a storage subsystem, or other relevant performance indicators at a backup source system.

Method 300 proceeds to step 320, where the backup engine adjusts a data ingestion rate from the backup source based on the measured resource utilization. As described above, the backup engine can adjust the data ingestion rate from the backup source according to a backup policy associated with the backup source. In one example, an increase in resource utilization by the primary workload at a source system may result in a corresponding decrease in the allowable resource utilization (and thus, ingestion rate) of backup operations performed at the source system. In other cases, the backup policy associated with the backup source may prioritize the primary workload at the backup source or backup operations.

Figure 4:
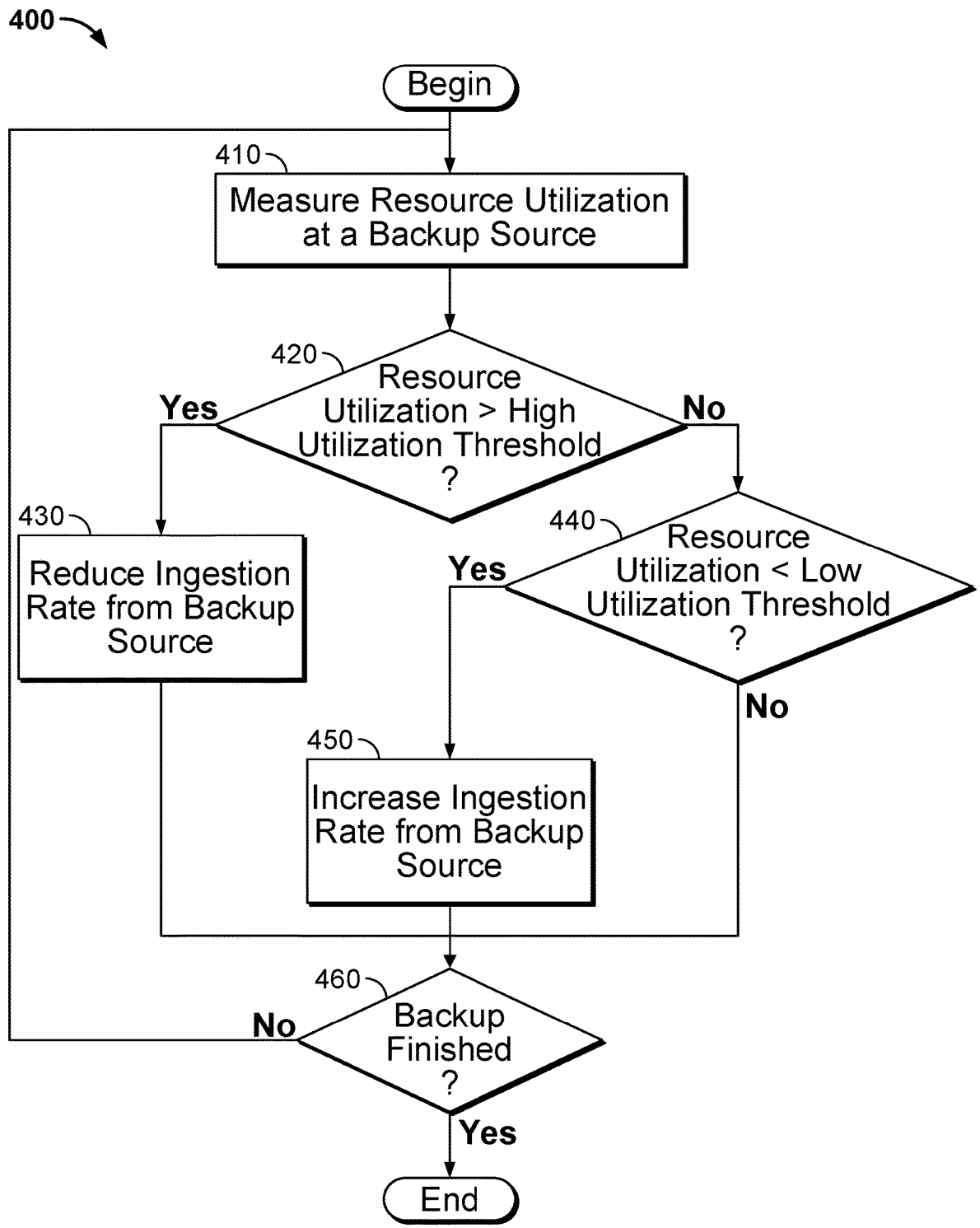
FIG. 4 illustrates an example method for adjusting a backup ingestion rate based on resource utilization at a source system and activity thresholds, according to one embodiment.

FIG. 4 illustrates example operations 400 for dynamically adjusting a data ingestion rate for backup operations based on high activity thresholds and low activity thresholds, according to some embodiments. Method 400 begins at step 410, where the backup engine measures resource utilization at a backup source.

Method 400 proceeds to step 420, where the backup engine compares the measured resource utilization to a high utilization threshold. As discussed above, the high utilization threshold may be configured for each backup source and may be stored as a value in backup policy 128. If the measured resource utilization exceeds the high utilization threshold, method 400 proceeds to step 430. At step 430, the backup engine reduces the data ingestion rate from the backup source.

If the measured resource utilization is less than the high utilization threshold, method 400 proceeds from step 420 to step 440. At step 440, the backup engine compares the measured resource utilization to a low utilization threshold. If the measured resource utilization is less than the low utilization threshold, method 400 proceeds to step 450, where the backup engine increases the data ingestion rate from the backup source.

After the backup engine modifies the ingestion rate or determines that no adjustment is necessary, method 400 proceeds to step 460, where the backup engine determines whether or not backup operations are complete for the backup source. If backup operations are not complete, method 400 returns to step 410 to continually monitor and, if necessary, modify the ingestion rate from the backup source while backup operations are running. Otherwise, method 400 ends.

Figure 5:
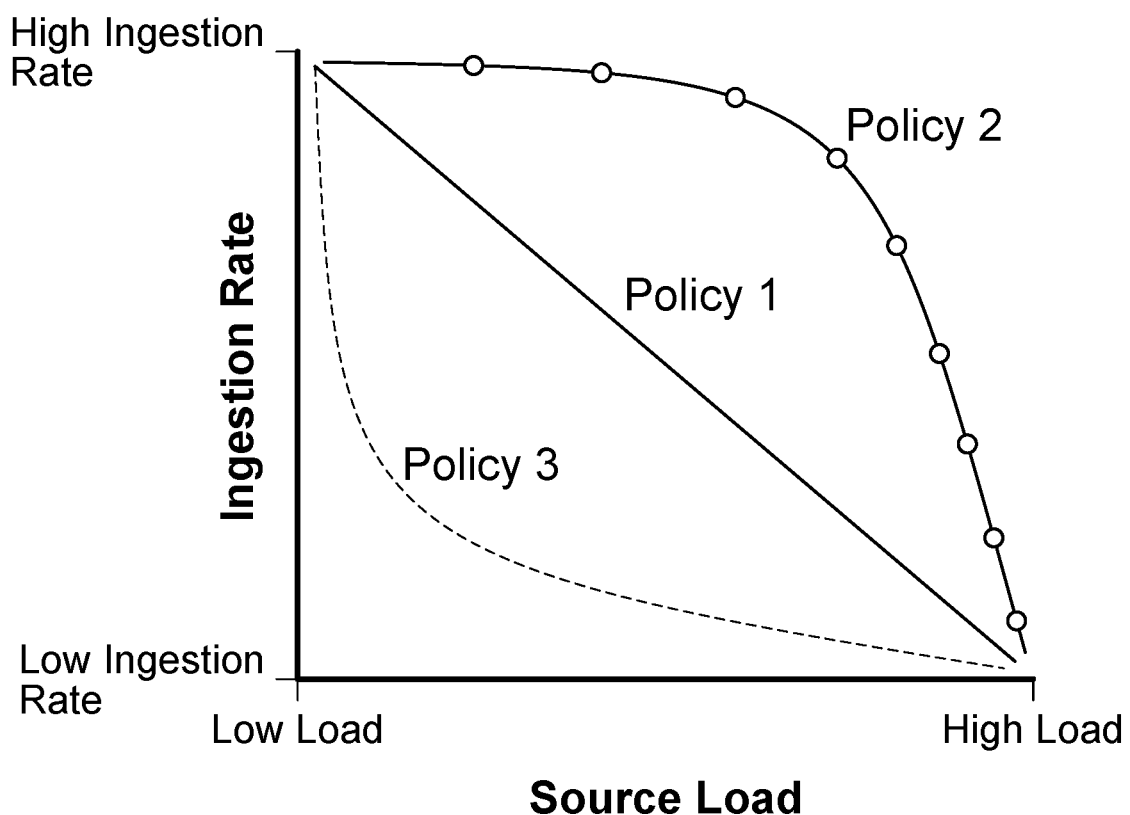
FIG. 5 illustrates example policies for managing a backup ingestion rate based on resource utilization at a source system, according to one embodiment.

FIG. 5 illustrates an example graph illustrating backup policies that can be used to determine a rate of data ingestion, according to some embodiments. Policy 1, illustrated by the straight line, illustrates an example policy in which source performance (e.g., the primary workload at the backup source) and backup operations have equal priority. That is, as the primary workload uses more resources, the backup engine correspondingly decreases the amount of system resources available for backup operations (e.g., data ingestion by the backup engine).

Policy 2, illustrated by the dotted line, shows an example policy in which backup ingestion has a higher priority than the primary workload at the backup source. Under Policy 2, resource utilization for the backup engine (and thus, the ingestion rate used for backup operations) decreases gradually as the primary workload at the backup source increases until resource utilization for the primary workload at the backup source reaches a threshold amount. After resource utilization for the primary workload reaches the threshold, the backup engine aggressively decreases the ingestion rate used for backup operations.

Policy 3, illustrated by the dashed line, shows an example policy in which the primary workload at the backup source is prioritized over data ingestion for backup operations. Under Policy 3, a backup engine can use a high ingestion rate when the primary workload at the backup source is idle. As resource utilization for the primary workload increases, the data ingestion rate is aggressively reduced.

Figure 6:
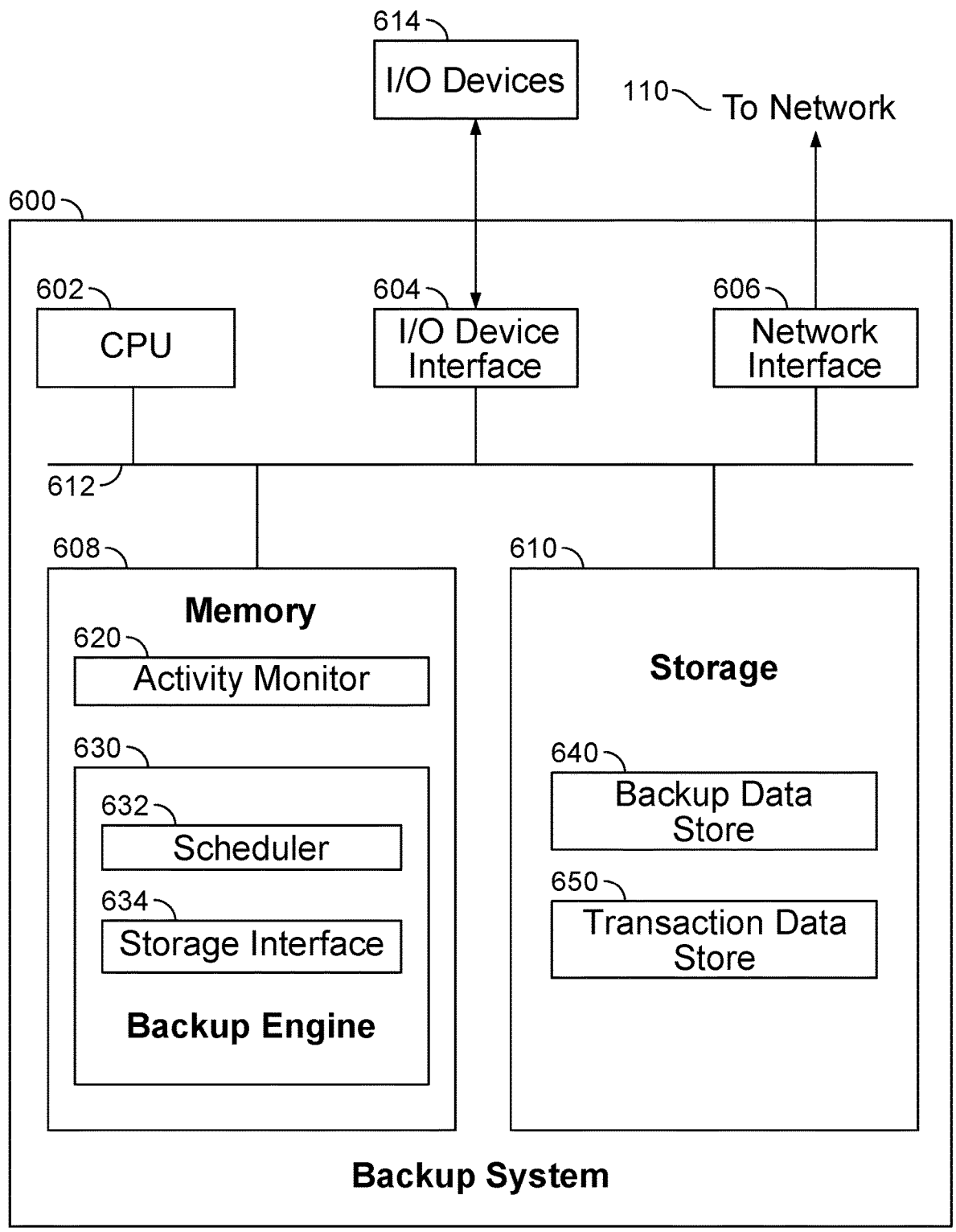
FIG. 6 illustrates an example computing system for performing backups based on a dynamically monitored ingestion rate, according to one embodiment.

FIG. 6 illustrates an example backup system 600 that uses information about resource utilization at a backup source to dynamically adjust a data ingestion rate for backup operations, according to an embodiment. As shown, the backup system 600 includes, without limitation, a central processing unit 602, one or more I/O device interfaces 604, which may allow for the connection of various I/O devices 614 (e.g., keyboards, displays, mouse devices, pen input, etc.) to the backup system 600, network interface 606, a memory 608, storage 610, and an interconnect 612.

CPU 602 may retrieve and execute programming instructions stored in the memory 608. Similarly, the CPU 602 may retrieve and store application residing in the memory 608. The interconnect 612 transmits programming instructions and application data among the CPU 602, I/O device interface 604, network interface 606, memory 608, and storage 610. CPU 602 is included to be representative of a single CPU, multiple CPUs, a single CPU having multiple processing cores, and the like. Additionally, the memory 608 is included to be representative of a random access memory. Furthermore, the storage 610 may be a disk drive. Although shown as a single unit, the storage 610 may be a combination of fixed and/or removable storage devices, such as fixed disc drives, removable memory cards or optical storage, network attached storage (NAS), or a storage area-network (SAN).

As shown, memory 608 includes an activity monitor 620 and a backup engine 630. As discussed above, activity monitor 620 is generally configured to obtain resource utilization information from one or more backup sources. The resource utilization information may include, for example, storage subsystem throughput (e.g., read/write activity), network interface throughput, processor idle time, and so on. Activity monitor 620 may be configured to continually monitor resource utilization at one or more backup sources and log both instantaneous and average resource utilization for use by backup engine 630 in determining and dynamically adjusting a data ingestion rate to use in backing up a source system.

Backup engine 630 generally includes a scheduler 632 and a storage interface 634. As discussed above, scheduler 632 may periodically query activity monitor 620 for resource utilization information at a particular backup source. Based on the obtained resource utilization information and a backup policy at the backup source, scheduler 632 adjusts the data ingestion rate. Scheduler 632 may decrease the data ingestion rate when resource utilization for the primary workload at the backup source increases. Correspondingly, scheduler 632 may increase the data ingestion rate when resource utilization for the primary workload at the backup load decreases.

Storage interface 634 allows backup system 600 to obtain data from a backup source and commit backup data to storage 610. Storage interface 634 may obtain data from a backup source at the ingestion rate determined by scheduler 632. As storage interface 634 ingests data from a backup source, storage interface 634 compares the ingested data to corresponding data in a previous backup stored in storage 610 (e.g., in backup data store 640). If the ingested data and the previously backed up data matches, storage interface 634 writes a pointer to the previously backed up data to storage 610; otherwise, storage interface 634 writes the ingested data to storage 610. When backup engine 630 completes backup operations on the source system, storage interface 634 commits a record of the backup to storage 610 (e.g., to transaction data store 650).

As shown, storage 610 includes a backup data store 640 and a transaction data store 650. Storage 610 may be configured as a network file store (NFS) accessible by one or more remote systems. Backup data store 640 generally includes backup data from one or more source systems. As discussed above, backup data may include a base, bit-by-bit update. Subsequent updates may generate a plurality of pointers to unchanged data from a previous update and bit-by-bit data blocks corresponding to changed or new data. Transaction data store 650 may be a persistent data store, and transaction data store 650 generally stores information about backups performed on one or more backup sources.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a solid state drive (SSD), a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

What is claimed is:

1. A method, comprising:
    querying, by an activity monitor of a backup system, a source system to obtain a resource utilization related to one or more performance metrics of the source system in performing at least a primary workload;
    adjusting, by a backup engine of the backup system, a data ingestion rate from the source system, wherein the data ingestion rate from the source system is adjusted based on the one or more performance metrics of the source system in performing at least the primary workload, wherein a rate of change at which the data ingestion rate decreases as the primary workload at the source system increases is based on a priority of the primary workload performed by the source system with respect to data ingestion for backup operations; and
    ingesting data from the source system at the adjusted data ingestion rate.

2. The method of claim 1, wherein the data ingestion rate is determined based on the resource utilization.

3. The method of claim 1, wherein a query of the source system obtains information about read activity, write activity, throughput, storage system latency, and/or processor utilization.

4. The method of claim 1, further comprising logging instantaneous resource utilization.

5. The method of claim 1, further comprising logging a moving average of resource utilization.

6. The method of claim 1, wherein the priority of the primary workload is prioritized over backup operations associated with the backup engine.

7. The method of claim 1, wherein a priority of backup operations associated with the backup engine is prioritized over the priority of the primary workload.

8. The method of claim 1, wherein a priority of backup operations associated with the backup engine is equal to the priority of the primary workload.

9. The method of claim 1, wherein adjusting the data ingesting rate from the source system includes polling for the resource utilization.

10. The method of claim 1, wherein the data ingestion rate from the source system is adjusted based in part on one or more activity thresholds, wherein the one or more activity thresholds includes a high activity threshold, wherein the high activity threshold indicates a primary workload resource utilization at which the data ingestion rate is to be reduced.

11. The method of claim 10, further comprising reducing the data ingestion rate from the source system in response to the primary workload resource utilization being greater than the high activity threshold.

12. The method of claim 1, wherein the data ingestion rate from the source system is adjusted based in part on one or more activity thresholds, wherein the one or more activity thresholds includes a low activity threshold, wherein the low activity threshold indicates a primary workload resource utilization at which the data ingestion rate is to be increased.

13. The method of claim 12, further comprising increasing the data ingestion rate from the source system in response to the primary workload resource utilization being less than the low activity threshold.

14. The method of claim 1, wherein the data ingestion rate from the source system is adjusted based on changes to the one or more performance metrics of the source system in performing at least the primary workload.

15. The method of claim 1, wherein the one or more performance metrics of the source system in performing at least the primary workload include at least one or more of CPU usage, memory usage, or network throughput.

16. The method of claim 1, wherein the source system is configured to host one or more virtual machines that share resources of the source system.

17. The method of claim 1, wherein the source system is configured to provide one or more services.

18. The method of claim 1, wherein the source system is configured to host one or more databases.

19. A non-transitory computer readable storage medium and comprising computer instructions for:
    querying, by an activity monitor of a backup system, a source system to obtain a resource utilization related to one or more performance metrics of the source system in performing at least a primary workload;
    adjusting, by a backup engine of the backup system, a data ingestion rate from the source system, wherein the data ingestion rate from the source system is adjusted based on the one or more performance metrics of the source system in performing at least the primary workload, wherein a rate of change at which the data ingestion rate decreases as the primary workload at the source system increases is based on a priority of the primary workload performed by the source system with respect to data ingestion for backup operations; and
    ingesting data from the source system at the adjusted data ingestion rate.

20. A system, comprising:
    a processor configured to:
        query, by an activity monitor of a backup system, a source system to obtain a resource utilization related to one or more performance metrics of the source system in performing at least a primary workload;

adjust, by a backup engine of the backup system, a data ingestion rate from the source system, wherein the data ingestion rate from the source system is adjusted based on the one or more performance metrics of the source system in performing at least the primary workload and one or more activity thresholds, wherein a rate of change at which the data ingestion rate decreases as the primary workload at the source system increases is based on a priority of the primary workload performed by the source system with respect to data ingestion for backup operations; and ingest data from the source system at the adjusted data ingestion rate; and a memory coupled to the processor and configured to provide the processor with instructions.

\* \* \* \* \*